(12) United States Patent
Senkyr et al.

(10) Patent No.: US 11,015,734 B2
(45) Date of Patent: May 25, 2021

(54) VALVE POSITION CONTROL

(71) Applicant: Honeywell International Inc., Morris Plains, NJ (US)

(72) Inventors: Jiri Senkyr, Brno (CZ); Milan Fedor, Brno (CZ)

(73) Assignee: Honeywell International Inc., Charlotte, NC (US)

( * ) Notice: Subject to any disclaimer, the term of this patent is extended or adjusted under 35 U.S.C. 154(b) by 166 days.

(21) Appl. No.: 16/113,370

(22) Filed: Aug. 27, 2018

(65) Prior Publication Data

US 2020/0063890 A1   Feb. 27, 2020

(51) Int. Cl.
| H02P 8/00 | (2006.01) |
| F16K 37/00 | (2006.01) |
| F23N 1/00 | (2006.01) |
| F23N 5/24 | (2006.01) |

(52) U.S. Cl.
CPC ...... *F16K 37/0041* (2013.01); *F16K 37/0083* (2013.01); *F23N 1/005* (2013.01); *F23N 5/245* (2013.01); *F23N 2223/04* (2020.01); *F23N 2235/14* (2020.01); *F23N 2235/24* (2020.01); *F23N 2241/08* (2020.01)

(58) Field of Classification Search
CPC .......................... F16K 37/0041; F16K 37/0083
USPC ....................................................... 318/696
See application file for complete search history.

(56) References Cited

U.S. PATENT DOCUMENTS

| 5,251,662 | A | * | 10/1993 | Rubel | F16K 11/052 137/561 A |
| 5,711,507 | A | | 1/1998 | Berget et al. | |
| 5,918,195 | A | | 6/1999 | Halgrimson et al. | |
| 6,044,857 | A | * | 4/2000 | Stege | G05B 19/042 137/1 |
| 6,198,243 | B1 | | 3/2001 | Ritmanich et al. | |
| 6,286,532 | B1 | * | 9/2001 | van Nieuwstadt | F16K 31/0675 137/1 |
| 7,963,185 | B2 | | 6/2011 | Spickard | |
| 2002/0170291 | A1 | * | 11/2002 | Shirakawa | F02M 47/027 60/602 |
| 2003/0041593 | A1 | * | 3/2003 | Yoshida | F02D 41/042 60/285 |
| 2004/0231354 | A1 | * | 11/2004 | Tsuchikawa | F25C 1/147 62/353 |

(Continued)

OTHER PUBLICATIONS

International Search Report, International Application No. PCT/US2019/047648, dated Dec. 12, 2019 (12 pgs.).

(Continued)

*Primary Examiner* — Erick D Glass (74) *Attorney, Agent, or Firm* — Seager, Tufte & Wickhem, LLP (57) ABSTRACT

A method for calibrating a position of a control valve within a gas valve assembly for controlling fuel flow to a combustion appliance. The method may include moving the control valve to a second end stop, moving the control valve from the second end stop to a first end stop while counting a number of steps traveled by a stepper motor driving the control valve, and comparing the counted number of steps traveled from the second end stop to the first end stop to a reference value stored in a memory of the controller. If the counted number of steps does not match the reference value, the gas valve assembly may be placed in a lockout mode.

18 Claims, 8 Drawing Sheets

(56) References Cited

U.S. PATENT DOCUMENTS

2016/0141985 A1   5/2016   Viscardi et al.
2016/0201575 A1   7/2016   Bertsch, IV et al.
2018/0080649 A1   3/2018   Kucera et al.

OTHER PUBLICATIONS

Written Opinion of the International Searching Authority, International Application No. PCT/US2019/047648, dated Dec. 12, 2019 (6 pgs).

* cited by examiner

VALVE POSITION CONTROL

TECHNICAL FIELD

The present disclosure relates generally to systems and methods for calibrating a control valve position, and more particularly to calibrating a control valve position without the use of a separate position sensor.

BACKGROUND

In many cases, a combustion appliance may include a burner that is fed air by a modulating blower or the like and fuel is fed by a modulating gas valve. A controller may control the position of the modulating gas valve in order to control the air/fuel ratio that is delivered to the burner. To help provide efficient, clean and safe operation of the burner, the position of the gas valve needs to be controlled within fairly tight limits. What would be desirable is an improved method and system for maintaining control of the position of a gas valve over an extended period of time.

SUMMARY

The present disclosure relates generally to systems and methods for maintaining control of the position of a gas valve over an extended period of time. In some cases, this may include calibrating the position of the gas valve from time to time. The gas valve may include a gas valve assembly that has a valve body and a control valve.

An illustrative method for calibrating the position of the control valve of the gas valve assembly may include initiating a calibration mode in a controller. Once in the calibration mode, the controller may be configured to move the control valve to a second end stop, move the control valve from the second end stop to a first end stop while counting a number of steps traveled by a stepper motor driving the control valve, and compare the counted number of steps traveled from the second end stop to the first end stop to a reference value stored in a memory of the controller. When the counted number of steps does not match the reference value, the controller may enter a lockout mode and may keep the control valve at the first end stop (e.g. fully closed position). When the counted number of steps matches the reference value, the controller may reset the position counter to an initial value (e.g. fully closed value). Subsequent movement of the control valve may increment the position counter with each motor step, and the current position of the control valve may be identified and controlled based on the position counter value.

In another example, a gas valve assembly for controlling fuel flow to a combustion appliance may include a valve body with an inlet port and an outlet port, and a fluid path extending between the inlet port and the outlet port. The valve body may further include a control valve situated in the fluid path between the inlet port and the outlet port, a drive train coupled to the control valve, a stepper motor coupled to the drive train, and a controller secured relative to the valve body and in communication with the stepper motor. The controller may be configured to command the stepper motor to drive the control valve via the drive train between a fully open position, a fully closed position, and a plurality of intermediate positions. The controller may be configured to selectively enter a calibration mode. Once in the calibration mode, the controller may be configured to command the stepper motor to drive the control valve to the fully open position, once the control valve is in the fully open position, command the stepper motor to drive the control valve from the fully open position to the fully closed position while counting a number of steps traveled by the stepper motor, and compare the counted number of steps traveled by the stepper motor to a reference value stored in a memory of the controller. When the counted number of steps does not match the reference value, the controller may be configured to enter a lockout mode and keep the control valve in the fully closed position. When the counted number of steps matches the reference value, the controller may reset the position counter to an initial value (e.g. fully closed value). Subsequent movement of the control valve may increment the position counter with each motor step, and the current position of the control valve may be identified and controlled based on the position counter value.

In another example, a gas valve assembly for controlling fuel flow to a burner may comprise a valve body with an inlet port and an outlet port, and a fluid path extending between the inlet port and the outlet port. The valve body may further include a control valve situated in the fluid path between the inlet port and the outlet port, a stepper motor for driving the control valve, and a controller for controlling the stepper motor. The controller may be configured to command the stepper motor to drive the control valve between a first end stop and a second end stop The controller may be configured to selectively enter a calibration mode, and once in the calibration mode, the controller may be configured to command the stepper motor to drive the control valve to the second end stop, once the control valve is at the second end stop, command the stepper motor to drive the control valve from the second end stop to the first end stop while counting a number of steps traveled by the stepper motor, and compare the counted number of steps traveled by the stepper motor to a reference value. When the counted number of steps does not match the reference value, the controller may be configured to enter a lockout mode and keeps the control valve at the first end stop. When the counted number of steps matches the reference value, the controller may reset the position counter to an initial value. Subsequent movement of the control valve may increment the position counter with each motor step, and the current position of the control valve may be identified and controlled based on the position counter value.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The detailed description and drawings show several illustrative embodiments which are meant to be illustrative of the claimed disclosure.

Gas valves may be used to control the supply of fuel to a burner of a combustion appliance. In some cases, the gas valves are modulating gas valves that can be moved between a fully closed position, a fully open position and one or more intermediate positions. In some cases, the gas valve may be modulated between these positioned using a stepper motor. By controlling the position of the gas valve via the stepper motor, the gas valve can control the amount of fuel that is supplied to the burner of the combustion appliance to accommodate a variety of burner loads. Also, controlling the position of the gas valve via the stepper motor may be used to help control an air-to-fuel ratio that is supplied to the burner. A proper air-to-fuel ratio can help ensure efficient, clean and safe operation of the burner. As such, it is often desirable to know the position of the gas valve with some precision. The present disclosure relates generally to systems and methods for maintaining control of the position of a gas valve over an extended period of time. In some cases, this may include calibrating the position of the gas valve from time to time.

Figure 1:
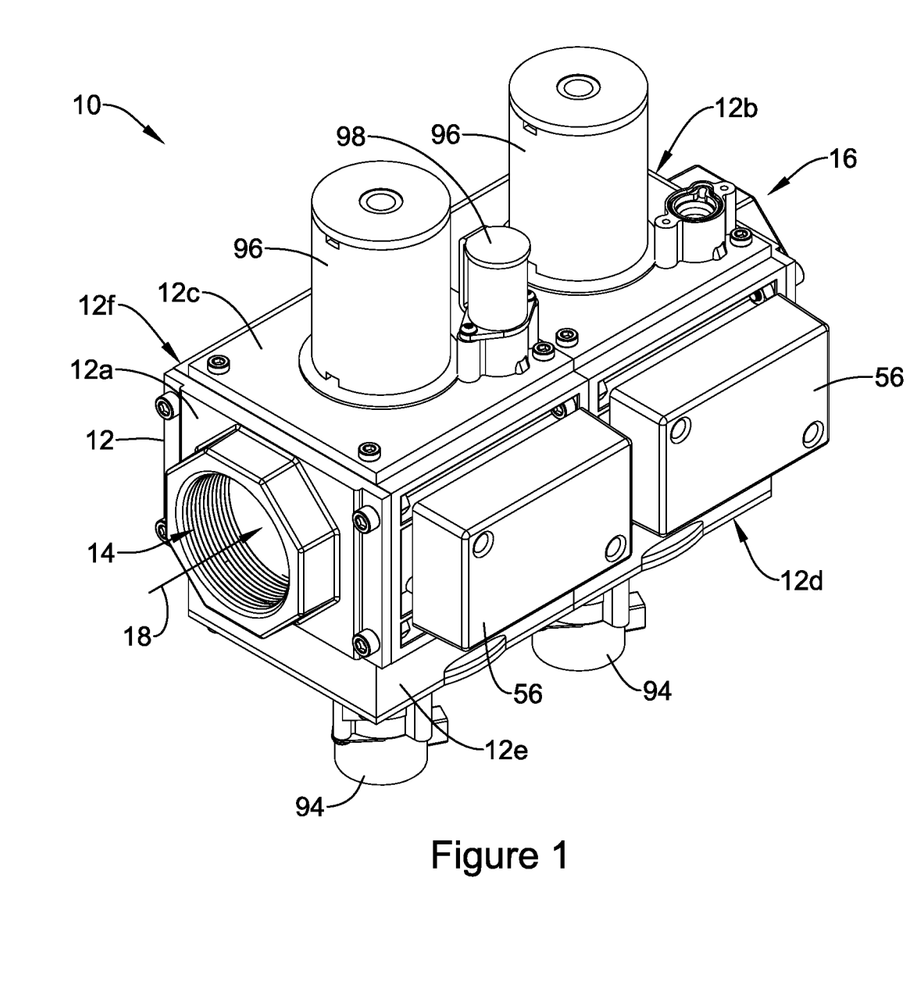
FIG. 1 is a schematic perspective view of an illustrative gas valve assembly.

FIG. 1 is a schematic perspective view of an illustrative valve assembly 10 for controlling gas flow to a combustion appliance or other similar or different device. In the illustrative embodiment, the gas valve assembly 10 may include a valve body 12, which may generally be a six sided shape or may take on any other shape as desired, and may be formed as a single body or may be multiple pieces connected together. As shown, valve body 12 may be a six-sided shape having a first end 12a, a second end 12b, a top 12c, a bottom 12d, a back 12e and a front 12f, as depicted in the various views of FIGS. 1-2. The terms top, bottom, back, front, left, and right are relative terms used merely to aid in discussing the drawings, and are not meant to be limiting in any manner.

Figure 3:
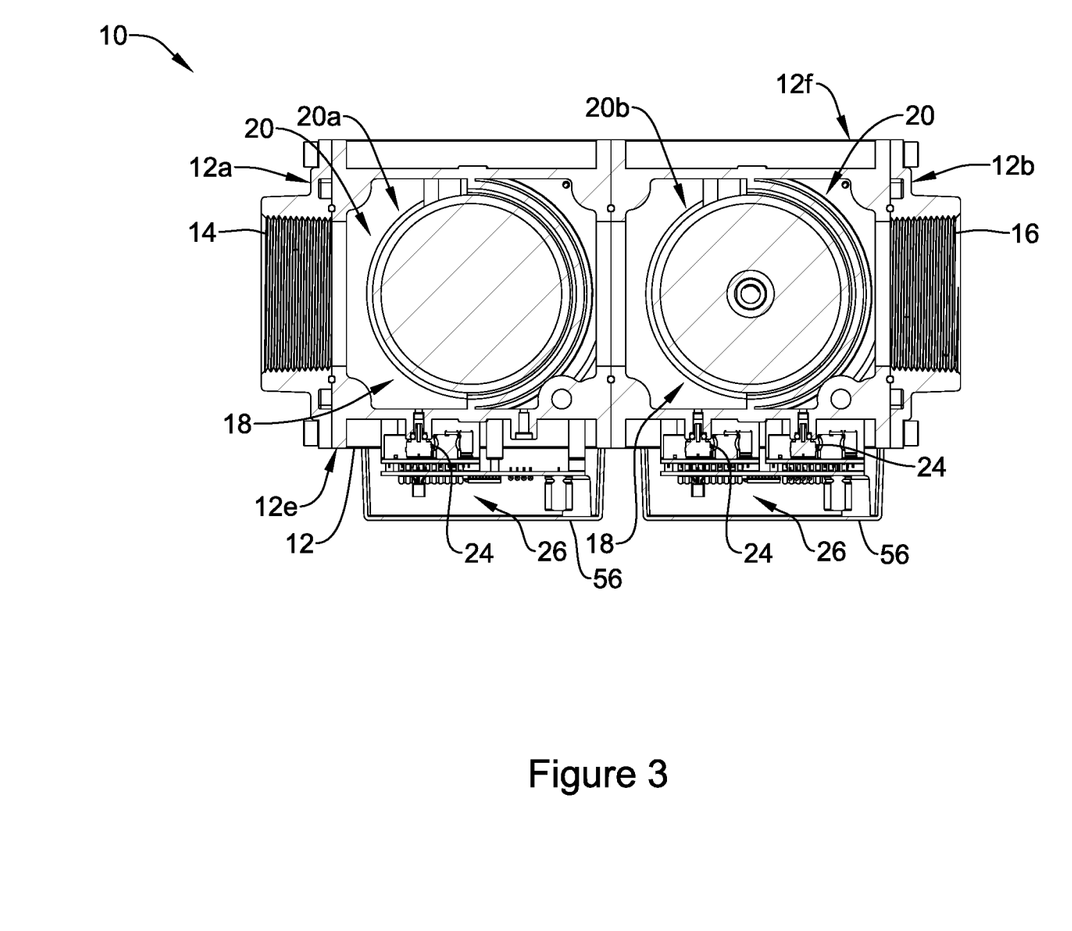
FIG. 3 is a cross-sectional view of the illustrative gas valve assembly of FIG. 1, taken along line 3-3 of FIG. 2.
Figure 5A:
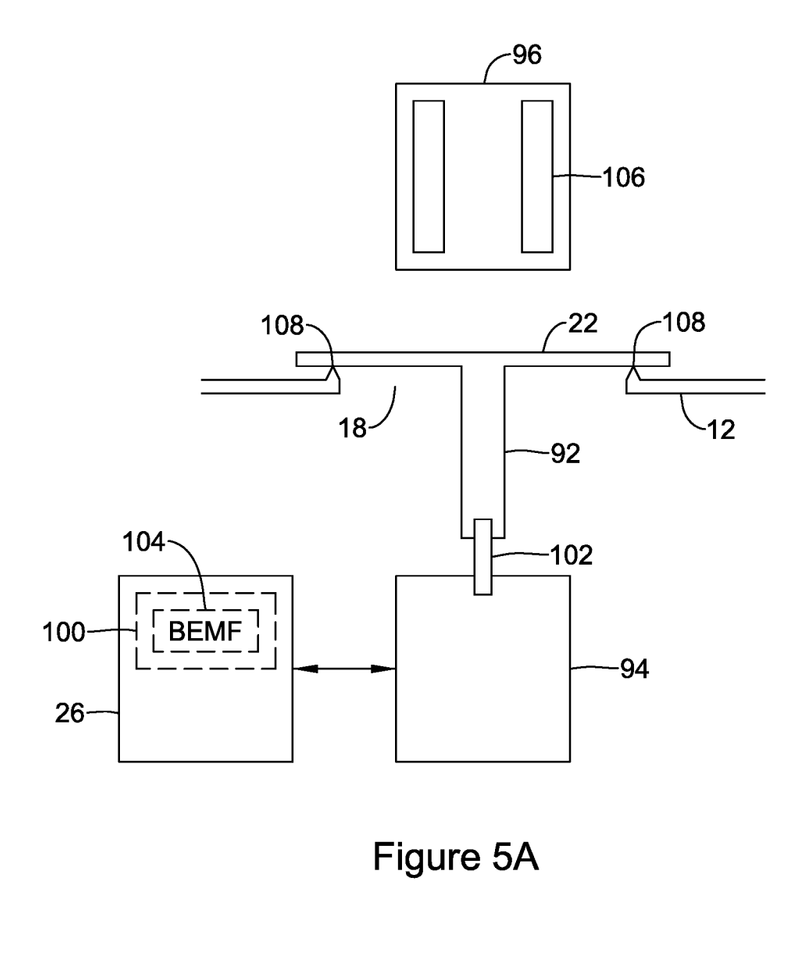
FIG. 5A is a schematic view of a control valve in a first configuration.
Figure 5B:
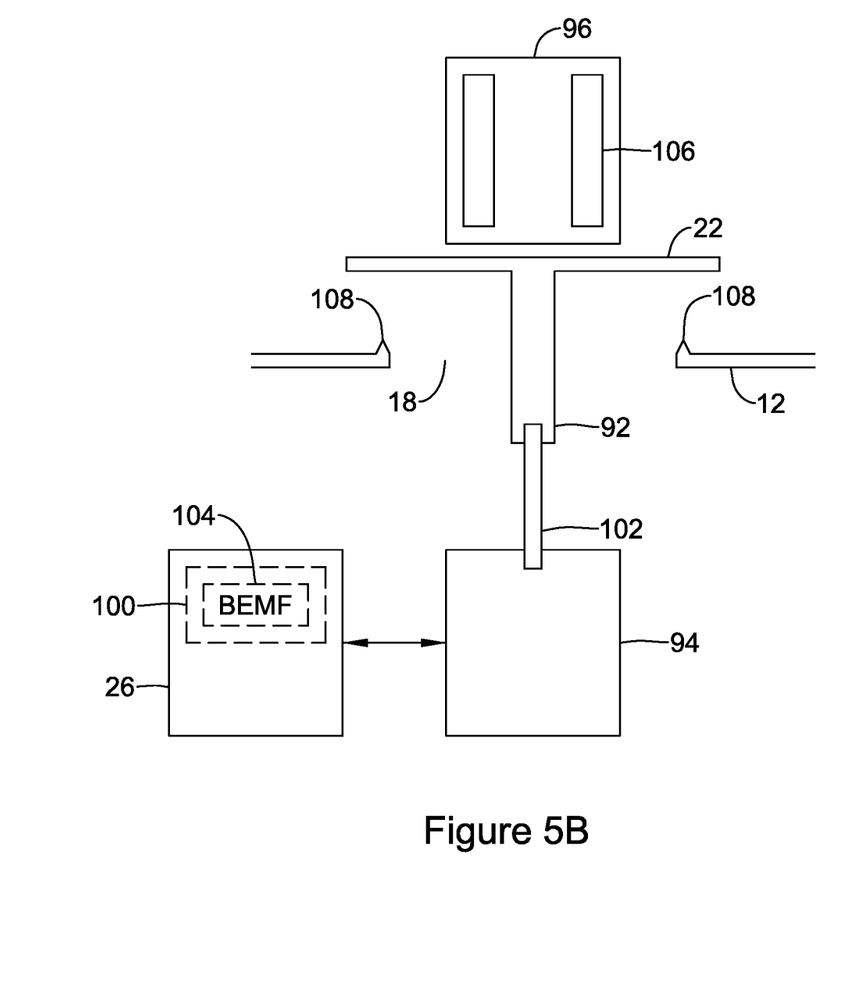
FIG. 5B is a schematic view of a control valve in a second configuration.

The illustrative valve body 12 includes an inlet port 14, an outlet port 16 and a fluid path or fluid channel 18 extending between the inlet port 14 and the outlet port 16. Further, the valve body 12 may include one or more gas valve ports 20 (e.g., a first valve port 20a and a second valve port 20b, shown in FIG. 3) positioned or situated in the fluid channel 18, one or more fuel or gas control valve(s) 22 (as shown in FIGS. 5A and 5B, for example) (sometimes referred to as valve sealing member(s)) moveable within the gas valve ports 20 (e.g., a first valve sealing member within the first valve port 20a and a second valve sealing member within the second valve port 20b, though not explicitly shown), one or more pressure sensor assemblies 24 (as shown in FIG. 3, for example), one or more position sensors (not explicitly shown), and/or one or more valve controllers 26 (as shown in FIG. 3, for example) affixed relative to or coupled to the valve body 12 and/or in electrical communication (e.g., through a wired or wireless connection) with pressure sensor assemblies 24, position sensor(s), and any other suitable device.

The illustrative valve assembly 10 may further include one or more actuators for operating moving parts therein. For example, valve assembly 10 may have actuators including, but not limited to, one or more stepper motors 94 (shown as extending downward from the bottom 12d of valve body 12 in FIG. 1), one or more solenoids 96 (shown as extending upward from the top 12c of valve body 12 in FIG. 1), and one or more servo valves 98 (a servo valve 98 is shown as extending upward from the top 12c of valve body 12 in FIG. 1-2, where a second servo valve has been omitted), where the servo valve 98 may be a 3-way auto-servo valve or may be any other type of servo valve. Other actuators may be utilized, as desired.

In one illustrative embodiment, the one or more solenoids 96 control whether the one or more gas valve ports 20 are open or closed. The one or more stepper motors 94 determine the opening size of the gas valve ports 20 when the corresponding control valve 22 is opened by the corresponding solenoid 96. Of course, the one or more stepper motors 94 would not be provided when, for example, the valve assembly 10 is not a "modulating" valve that allows more than one selectable flow rate to flow through the valve when the valve is open. The one or more actuators and/or motors 94, 96, 98 may be in electrical communication (e.g., through a wired or wireless connection) with the one or more valve controllers 26.

Figure 2:
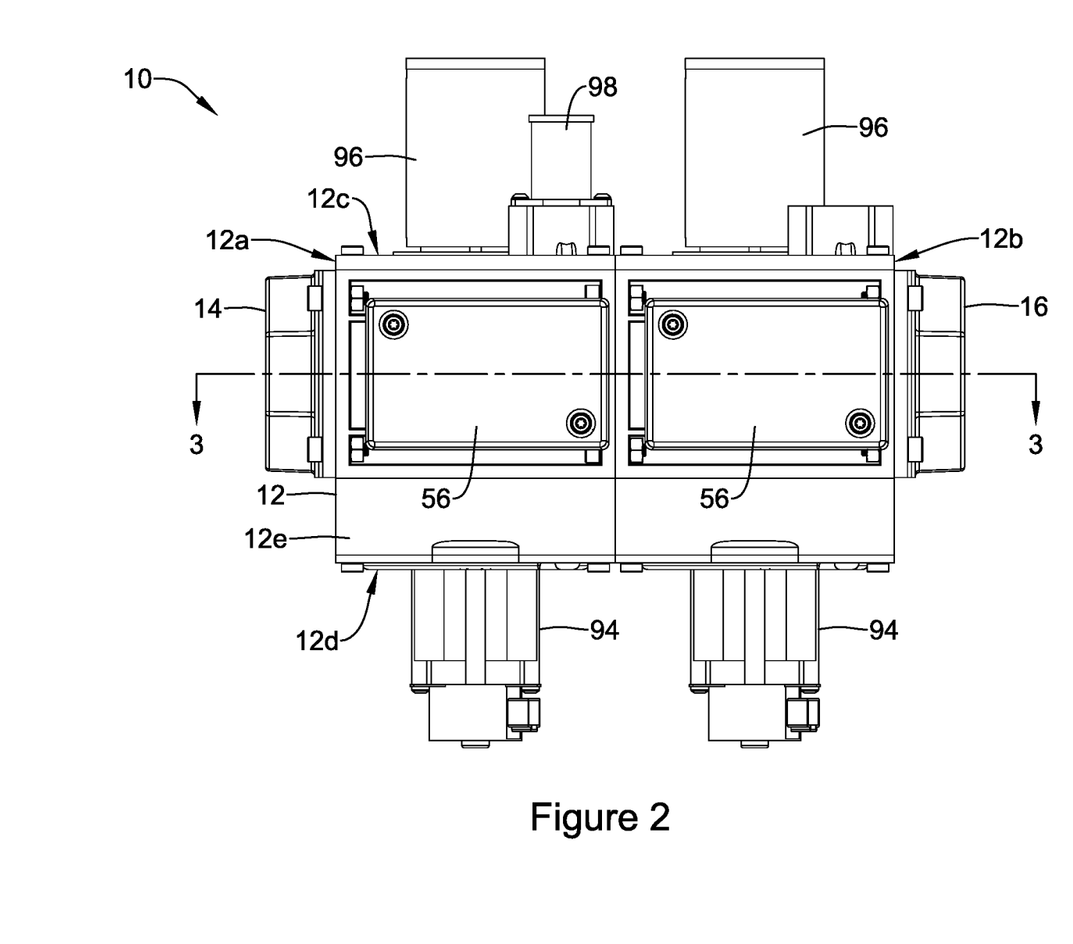
FIG. 2 is a schematic side view of the illustrative gas valve assembly of FIG. 1.

As shown, the valve body 12 may include one or more sensor and electronics compartments 56, which in the illustrative embodiment, extend from the back side 12e as depicted in FIGS. 1-2. The sensor and electronics compartments 56 may be coupled to or may be formed integrally with the valve body 12, and may enclose and/or contain at least a portion of the valve controllers 26, pressure sensor assemblies 24 and/or electronics required for operation of valve assembly 10 as described herein. Although the compartments 56 may be illustratively depicted as separate structures, the compartments 56 may be a single structure part of, extending from, and/or coupled to the valve body 12.

FIG. 3 illustrates a cross-sectional view of the illustrative valve assembly 10 taken at line 3-3 in FIG. 2. In the illustrative embodiment, the one or more fluid valve ports 20 may include a first gas valve port 20a and a second gas valve port 20b situated along and/or in communication with the fluid channel 18. This is a double-block valve design. Within each gas valve port 20, a control valve 22 may be situated in the fluid channel 18 and may be positioned (e.g., concentrically or otherwise) about an axis, rotatable about the axis, longitudinally and axially translatable, rotationally translatable, and/or otherwise selectively movable between a first position (e.g., an open or closed position) and a second position (e.g., a closed or open position) within the corresponding valve port 20. Movement of the control valve 22 may open and close the valve port 20.

It is contemplated that the control valve 22 may include one or more of a valve disk, a valve stem 92 and/or valve seal for sealing against a valve seat 108 (see, for example FIGS. 5A and 5B) situated in the fluid channel 18 and/or other similar or dissimilar components facilitating a seal. Alternatively, or in addition, the control valve 22 may include structural features and/or components of a gate valve, a disk-on-seat valve, a ball valve, a butterfly valve and/or any other type of valve configured to operate from a closed position to an open position and back to a closed position. An open position of a control valve 22 may be any position that allows fluid to flow through the respective gas valve port 20 in which the control valve 22 is situated, and a closed position may be when the control valve 22 forms at least a partial seal at the respective valve port 20 (see, for example, FIG. 5A). The control valve 22 may be operated through any technique. For example, the control valve 22 may be operated through utilizing a spring, an actuator to effect movement against the spring, and, in some cases, a position sensor to sense a position of the control valve 22. However, it is contemplated that a position sensor may not be required to determine the position of the control valve 22 relative to the corresponding valve seat, as will be further described herein.

The valve actuator(s) 106 (see, for example, FIGS. 5A and 5B) may be any type of actuator configured to operate the control valve 22 by actuating control valve 22 from the closed position to an open position and then back to the closed position during each of a plurality of operation cycles during a lifetime of the gas valve assembly 10. In some cases, valve actuator 106 may be a solenoid actuator (e.g., a first valve actuator and a second valve actuator), a hydraulic actuator, magnetic actuators, electric motors, pneumatic actuators, and/or other similar or different types of actuators, as desired. The valve actuators may be configured to selectively move the control valves 22 of the valve ports 20a, 20b between a closed position, which closes the fluid channel 18 between the inlet port 14 and the outlet port 16 of the valve body 12, and an open position. The gas valve assembly of FIGS. 1-3 is an example of a gas safety shutoff valve, or double-block valve. In some cases, however, it is contemplated that the gas valve assembly 10 may have a single control valve, or three or more control valves in series or parallel, as desired.

In some cases, the valve assembly 10 may include a characterized port defined between the inlet port 14 and the outlet port 16. A characterized port may be any port (e.g., a fluid valve port 20 or other port or restriction through which the fluid channel 18 may travel) at or across which an analysis may be performed on a fluid flowing therethrough. For example, if a flow resistance of a valve port 20 is known over a range of travel of the control valve, the one of the one or more gas valve ports 20 may be considered the characterized port. As such, and in some cases, the characterized port may be a port 20 having the control valve configured to be in an open position and in a closed position. Alternatively, or in addition, a characterized port may not correspond to a gas valve port 20 having a control valve. Rather, the characterized port may be any constriction or feature across which a pressure drop may be measured and/or a flow rate may be determined.

Figure 4:
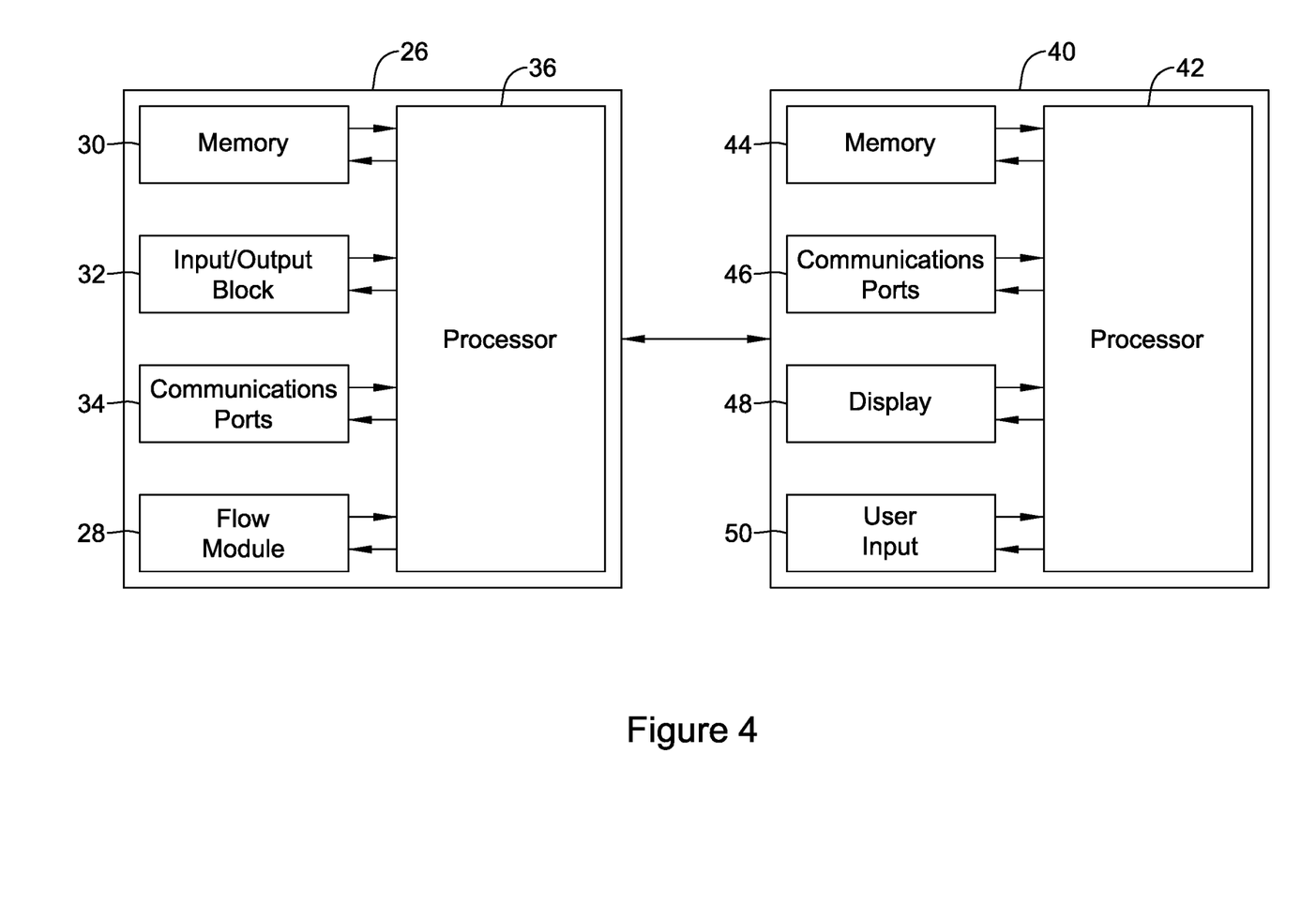
FIG. 4 is a schematic block diagram of an illustrative valve controller in communication with an illustrative external device.

In some cases, the gas valve assembly 10 may include a flow module 28 (see, for example, FIG. 4) for sensing one or more parameters of a fluid flowing through fluid channel 18, and in some cases, determining a measure related to a gas flow rate of the fluid through the fluid channel 18. In some instances, the flow module 28 may include a pressure block or pressure sensor assembly 24, a temperature sensor, a control valve position sensor and/or a valve controller 26, among other assemblies, sensors and systems for sensing, monitoring and/or analyzing parameters of a fluid flowing through fluid channel 18. Alternatively, or additionally, the flow module 28 may be a part of the valve controller 26, as shown in FIG. 4.

It is contemplated that the flow module 28 may utilize any type of sensor to facilitate determining a measure related to a flow rate of a fluid through the fluid channel 18, such as a pressure sensor, a flow sensor, a valve position sensor, and/or any other type of sensor, as desired. In one example, the flow module 28, which in some cases may be part of a valve controller 26, may be configured to monitor a differential pressure across a characterized port, and in some cases, a position of one or more control valves of the gas valve assembly 10. The information from monitoring may be utilized by the flow module 28 to determine and monitor the flow rate of fluid (liquid or gas) passing through the fluid channel 18. In some cases, the flow module 28 may determine a measure that is related to a gas flow rate through the fluid channel 18 based, at least in part, on the measure that is related to the pressure drop across the characterized port along with the pre-stored relationship in the memory 30. The memory may be a part of the valve controller 26 or more specifically part of the flow module 28, as desired. Additionally, the flow module 28 may further determine a relationship between a desired burner load (e.g. firing rate) and the measure related to a gas flow rate based, at least in part, on a previously established relationship stored in the memory 30. In some cases, the previously established relationship may include an air to fuel ratio (A/F) versus burner load curve.

The different relationships described herein may be generated during installation and/or calibration of the valve assembly 10, and may be stored as data tables or curves in the memory 30. Using the previously established relationship(s) between flow rate and burner load (e.g. firing rate) and a burner load control signal or command received at the valve assembly 10 from another device (e.g. building controller, system level controller or combustion appliance controller) within the system, the flow module 28 may be configured to determine a measure of fuel flow through the valve assembly 10 to achieve a desired A/F ratio. Thus, the flow module 28 may be consider an air/fuel controller, which may be part of the valve assembly 10.

In some instances, the flow module 28 may further be configured to determine a measure of cumulative fuel flow through the fluid channel 18 over a predetermined period of time. Additionally, or alternatively, the flow module 28 may be configured to determine a measure of instantaneous fuel flow through the fluid channel 18 in real time. Cumulative fuel consumption and/or instantaneous fuel consumption may be calculated from the fuel flow based, at least in part, on the Wobbe Index associated with the fluid flowing through the fluid channel 18, which also may be stored in the memory 30 of the valve assembly 10.

It is contemplated that electronic valve controller 26 may be physically secured or coupled to, or secured or coupled relative to, the valve body 12 (see, FIG. 3). The valve controller 26 may be configured to control and/or monitor a position or state (e.g., an open position and a closed position) of the control valves of the valve ports 20 and/or to perform other functions and analyses, as desired. In some cases, the valve controller 26 may be configured to close or open control valve(s) on its own volition, in response to control signals or commands from other systems or appliances (e.g., a system level controller, central building controller, or combustion appliance controller), and/or in response to received measures related to sensed pressures upstream, intermediate, and/or downstream of the characterized valve port(s), measures related to a sensed differential pressure across the characterized valve port(s), measures related to temperature sensed upstream, intermediate, and/or downstream of the characterized valve port(s), and/or in response to other measures, as desired. In one example, the valve controller 26 may be configured to close or open control valve(s) 22 in response to receiving a burner load (e.g. firing rate) control signal or command from a system or building level controller or an appliance controller (e.g. burner controller) to control a rate of flow of gas through the valve assembly 10 and to a connected appliance to achieve a desired A/F ratio for the commanded burner load.

It is further contemplated that the control valve 22 position (e.g. 30% open, 50% open or 75% open, etc.) may be maintained in the memory 30 of the valve controller 26 to deliver a desired flow rate of gas to the appliance. The stored position within the valve controller 26 needs to match the real mechanical position of the control valve 22 to help achieve efficient, clean and safe operation. To match an expected position (e.g. software position) with the real mechanical position, the memory 30 may store an algorithm configured to correlate a stepper motor counter value with an actual physical position of the control valve 22, as will be described in more detail herein.

The memory 30, which in some cases may be part of valve controller 26, may be configured to record data related to sensed pressures, sensed differential pressures, sensed temperatures, and/or other measures. The valve controller 26 may access this data, and in some cases, communicate (e.g., through a wired or wireless communication link) the data and/or analyses of the data to other systems (e.g., a system level or central building control). The memory 30 and/or other memory may be programmed and/or developed to contain software to affect one or more of the configurations described herein.

FIG. 4 is a schematic block diagram of an illustrative valve controller 26. The illustrative valve controller 26 includes a processor or controller 36. The valve controller 26 may be adapted or configured to operate in accordance with an algorithm that controls or at least partially controls portions of the valve assembly 10. The valve controller 26 may include a memory block 30 that may be considered as being electrically connected to the processor 36. The memory block 30 may be used to store any desired information, such as the aforementioned control algorithm, valve positions, set points, A/F ratio versus burner load curves, and the like. The processor 36 may store information within memory block 30 and may subsequently retrieved the stored information. The memory block 30 may be any suitable type of storage device, such as RAM, ROM, EPROM, a flash drive, a hard drive, and the like.

In many cases, the valve controller 26 may include an input/output block (I/O block) 32 having a number of wire terminals for receiving one or more wires from the valve assembly 10 and/or combustion appliance. Also, while the term I/O may imply both input and output, it is intended to include input only, output only, as well as both input and output. The I/O block 32 may be used to communicate one or more signals to and/or from the valve assembly 10 and/or combustion appliance. The valve controller 26 may have any number of wire terminals for accepting connections from the valve assembly 10 and/or combustion appliance. How many and which of the wire terminals are actually used at a particular installation will depend on the particular configuration of the valve assembly 10 and/or combustion appliance.

In some cases, as illustrated, the valve controller 26 may include a communications or data port 34. The communication ports 34 may be configured to communicate with the processor 36 and may, if desired, be used to either upload information to the processor 36, download information from the processor 36, provide commands to the processor 36, send commands from the processor 36, and/or perform any other suitable task. The communication port 34 may be a wireless port such as a Bluetooth™ port or any other wireless protocol. In some cases, communication port 34 may be a wired port such as a serial port, a parallel port, a CAT5 port, a USB (universal serial bus) port, or the like. In some instances, the communication port 34 may be a USB port and may be used to download and/or upload information from a USB flash drive. Other storage devices may also be employed, as desired. In some cases, a separate device 40 may be in communication with the processor 36 of the valve controller 26 to facilitate calibration procedures.

As noted above, the valve controller 26 may be in wired or wireless communication with an external device 40. The external device 40 may be a computing device separate from the valve assembly 10. For example, the external device 40 may be a system level controller, a central building controller, or combustion appliance controller. In some cases, the external device 40 may not be a part of the valve assembly 10 or combustion appliance. For example, the external device 40 may be a personal computer, tablet computer, smart phone, laptop computer, or other computer as desired. In some instances, the external device 40 may be a portable device which travels with an installer or technician.

The external device 40 may be adapted or configured to help commission a valve assembly 10, calibrate a control valve position, and/or generate an A/F curve for a particular valve assembly 10 and combustion appliance set up using a commissioning wizard or software program to facilitate commissioning of the valve assembly 10. The external device 40 may include a processor and a memory block 44 connected to the processor 42. The memory block 44 may be used to store any desired information, such as the aforementioned commissioning wizard, software programs, and the like. The processor 42 may store information within memory block 44 and may subsequently retrieved the stored information. The memory block 44 may be any suitable type of storage device, such as RAM, ROM, EPROM, a flash drive, a hard drive, and the like.

In some cases, as illustrated, the external device 40 may include a communications or data port 46. The communication ports 46 may be configured to communicate with the processor 42 and may, if desired, be used to either upload information to the processor 42, download information from the processor 42, provide commands to the processor 36, send commands from the processor 36, and/or perform any other suitable task. The communication port 46 may be a wireless port such as a Bluetooth™ port or any other wireless protocol. In some cases, communication port 46 may be a wired port such as a serial port, a parallel port, a CAT5 port, a USB (universal serial bus) port, or the like. In some instances, the communication port 46 may be a USB port and may be used to download and/or upload information from a USB flash drive. Other storage devices may also be employed, as desired. In some cases, the external device 40 may be in communication with the processor 36 of the valve controller 26 to facilitate calibration procedures.

The external device 40 may also include a display 48. The display 48 may be part of a personal computer, tablet computer, smart phone, laptop computer, or may include a standalone display. In some instances, the external device 40 may include a user input 50 for receiving a user input from a user. For example, the user input may include a keyboard, mouse, actuatable buttons, or a touchscreen display. These are just examples.

In some instances, the valve controller 26 may include or be in communication with a stepper motor 94 or other device to position the control valve 22 in a commanded position relative to the valve seat in the valve port 20. The stepper motor 94 may be in communication with the processor 36 of the valve controller 26, and the processor 36 may be configured to control, monitor, and/or record the position (e.g., axial position, radial position, etc.) of the control valve 22 within the valve port 20. In some cases, the valve controller 26 may maintain position counter that represents the number of motor steps of the stepper motor 94 that the control valve 22 is away from the valve seat. In some cases, the position counter has a value of zero when the control valve 22 is up against the valve seat the valve port 20 is fully closed. The position counter may have a value of "X" (e.g. 842) when the valve is at a fully open end stop, and the position counter may have a value of "X/2" (e.g. 421) at a position half-way between the fully closed position and the fully open position. The processor 36 may be configured to monitor and record the position of the control valve 22 based on the position counter value. In some cases, the processor 36 may increment/decrement the position counter with each step of the stepper motor 94 to keep track of the actual position of the control valve 22.

In some cases, a valve actuator 106 may be provided. The valve actuator 106 may be configured to effect the locking (e.g., the valve actuator 106 OFF) or the unlocking (e.g., the valve actuator 106 ON) of the control valve 22 in a particular position, such as the fully closed position.

In some cases, the stepper motor 94 and position counter may be used to calibrate a position of the control valve 22 and/or verify a position the control valve 22 from time to time. FIG. 5A illustrates a highly schematic view of the control valve 22 at a first end stop (e.g. fully closed position) and FIG. 5B illustrates a highly schematic view of the control valve 22 at a second end stop (e.g. fully open position). While the figures are described with the first end stop corresponding to the fully closed position and the second end stop corresponding to the fully open position, the reverse configuration is also contemplated. The stepper motor 94 may be controlled by a motor controller 100, which may be a part of the valve controller 26 or a separate controller in communication with valve controller 26, as desired. In some instances, the stepper motor 94 may be a reversible can stack stepper motor, although this is not required. The stepper motor 94 may be operationally coupled to a drive train 102 (or other output) that in turn may be operatively coupled to and configured to move the control valve 22 to a specified position. The drive train can include, for example, one or more gears or the like. For example, if a valve actuator 106 is provided and has unlocked control valve 22, the stepper motor 94 may be configured to move in a step-like manner to position the control valve 22 at any desired position between fully the closed and fully open positions, (e.g. 30% open, 50% open or 75% open), as desired by the valve control program. This may allow the valve assembly 10 to modulate the flow of gas.

In some cases, a back electromotive force (BEMF) 104 generated by the stepper motor 94 may be used to determine when the stepper motor 94 hits a first end stop (e.g. the fully closed position) and a second end stop (e.g. the fully open position). Measuring or monitoring the BEMF 104 may allow the valve controller 26 to detect motor stall and/or touching points or end stops. Knowing the end stops in terms of position counter values may allow the valve controller 26 to have an understanding of the position of the control valve 22 along the range of motion of the control valve 22. In some cases, the stepper motor 94 is driven to the end stop at the fully open position, as detected by a drop in back electromotive force (BEMF) 104. Then the stepper motor 94 may be driven to the opposing end stop at the fully closed position as detected by a drop in back electromotive force (BEMF) 104, while counting the number of motor steps required to move between the end stops. The counted number of motor steps may then be compared to a reference value, which may represent a calibrated number of motor steps determined at the factory during manufacture of the gas valve assembly 10. The calibrated number of motor steps may be dependent on the tolerances of the particular gas valve assembly 10 and thus the reference value may be unique to the particular gas valve assembly 10. If the control valve 22 should become stuck at an intermediate position, or if the drive train 102 or other component should become worn, the counted number of motor steps may not match the reference value. If the counted number of motor steps does not match the reference value, the valve controller 26 may enter a lockout mode, and may keep the control valve 22 at the end stop that corresponds to the fully closed position. If the counted number of motor steps does match the reference value, the valve controller 26 may reset a position counter, which re-calibrates the position counter with the actual physical position of the control valve 22. The counted number of motor steps may considered to "match" the reference value when the counted number of motor steps equals the reference value. In some cases, the counted number of motor steps may considered to "match" the reference value when the counted number of motor steps is within a threshold or error margin of the reference value.

It is contemplated that such re-calibration may occur during installation or whenever the valve controller 26 of the gas valve assembly 10 enters a calibration mode. It is contemplated that the gas valve assembly 10 may be configured to enter a calibration mode each time the gas valve assembly 10 is powered-up, at the beginning or end of each burner cycle, at periodic intervals (e.g. each day, week, month), when other diagnostics indicate a possible error in the positioning of the control valve 22, and/or at any other suitable time.

FIG. 5A illustrates the control valve 22 against a first end stop with the control valve 22 in a fully closed position. As the stepper motor 94 drives the control valve 22 to this position (e.g., from a more open position), the stepper motor 94 may stall once the first end stop is contacted as no further movement is possible in the closed direction. FIG. 5B illustrates the control valve 22 against a second end stop with the control valve 22 in a fully open position. As the stepper motor 94 drives the control valve 22 to this position (e.g., from a more closed position), the stepper motor 94 may stall once the second end stop is contacted as no further movement is possible in the open direction. The valve controller 26 may be configured to detect a difference in the BEMF 104 induced in the motor winding when the stepper motor 94 is stalled versus when the stepper motor 94 freely running. This difference in the BEMF 104 may be used to detect when the control valve 22 has reached an end stop. While use of BEMF 104 is one approach for detecting the end stop positions of the control valve 22, it is contemplated that any suitable technique may be used including, for example, detecting an increase in drive current to the stepper motor, use of a hall sensor to detect rotation of the stepper motor, use of end stop sensors, and/or any other suitable technique.

Figure 6:
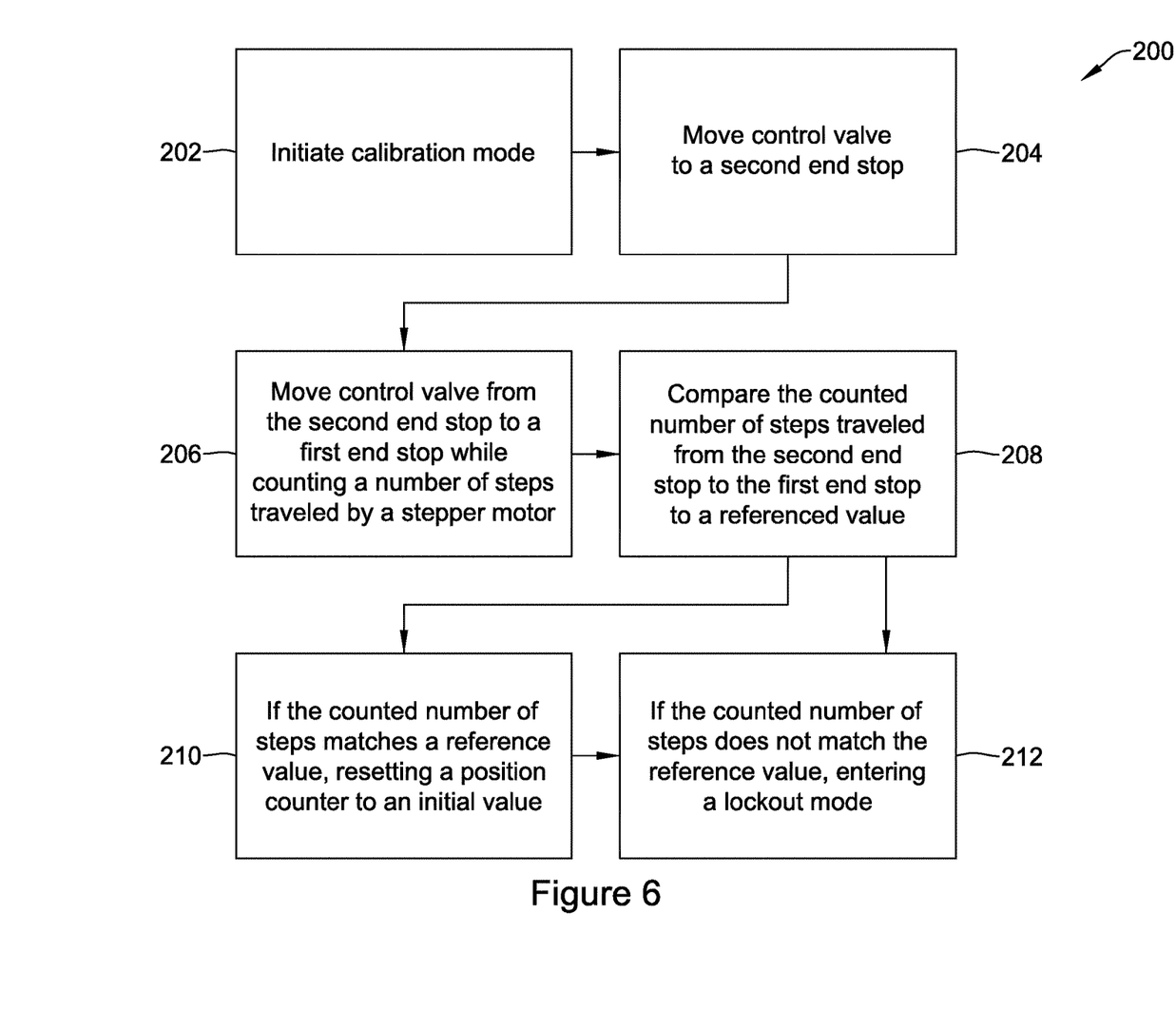
FIG. 6 is a block diagram of an illustrative method for calibrating a position of a control valve.

FIG. 6 is an illustrative flow chart of a method 200 for calibrating the control valve 22 position from time to time. To begin, a calibration mode may be initiated within the valve controller 26, as shown at step 202. It is contemplated that the valve controller 26 may be configured to automatically initiate the calibration mode in response to a predetermined event. For example, the valve controller 26 may be configured to initiate the calibration mode upon power-up of the gas valve assembly. When the gas valve assembly 10 is configured to supply gas to a burner that operates in burner cycles, the valve controller 26 may be configured to automatically initiate the calibration mode at the beginning of a burner cycle and/or at the end of a burner cycle. In some cases, the calibration mode may be initiated for each burner cycle, although this is not required. In other cases, the calibration mode may be initiated at a predetermined schedule based on, for example, a number of burner cycles or a length of time (e.g. hourly, daily, weekly, etc.). Alternatively, or additionally, the calibration mode may be initiated manually by an installer or technician, using, for example, an external device 40 or a user interface of the valve controller 26. Once in the calibration mode, the valve controller 26 may perform a calibration to verify that the physical position of the control valve 22 matches the position expected by the valve controller 26.

In some cases, once the calibration mode has been initiated, the valve controller 26 may move the control valve 22 via the stepper motor 94 to the fully open position such that the control valve 22 is moved to or otherwise contacts a second end stop, as shown at step 204. In some cases, the stepper motor 94 may be driven a few steps (for example, in the range of 10 to 20 steps) at an enhanced current level as the control valve approaches and then engages the second end stop. This may help ensure that the control valve 22 fully reaches the second end stop. In some instances, the second end stop may be detected by a change in BEMF 104, a higher sensed current draw from the stepper motor 94, and/or in any other suitable manner.

In other embodiments, once the calibration mode has been initiated, the current level may be reduced to in the range of 70-90%, or approximately 80%, of the current level used in the normal operating mode. Reducing the current level may suppress or limit a bounce back of the motor armature when an end stop is contacted. For example, when operating at the currents of the normal operating mode, the motor armature may jump or bounce back to a greater extent than lower current levels which may negatively impact the precision of end stop detection.

Once the stepper motor 94 is at the second end stop, the valve controller 26 may set a step count of the motor 94 and/or a control valve 22 position to zero. Once the second end stop has been detected, the current level may be increased (e.g., in the range of up to 120% of normal operating level) The valve controller 26 may then move the control valve 22 via the stepper motor 94 for a few steps (e.g., up to about 30 steps) towards the fully closed position. Increasing the current level for the first few steps may reduce the likelihood that the valve drive train is stuck at the second end stop. After the few steps at the increased currently level, the current level may be decreased back to in the range of 70-90%, or approximately 80%, and the control valve 22 moved via the stepper motor 94 to the fully closed position such that the control valve 22 is moved to or otherwise contacts a first end stop while counting the number of motor steps, as shown at step 206. In some cases, the valve controller 26 may be configured to move the control valve 22 a full valve stroke plus a predetermined clearance margin. The predetermined clearance margin may account for particular manufacturing tolerances associated with the gas valve assembly 10. For example, the clearance margin may account for tolerances within the valve body 12, the valve stem 92, the stepper motor output, drive train 102, etc. In some cases, the stepper motor 94 may be driven a few steps (for example, in the range of 10 to 20 steps) at an enhanced current level as the control valve 22 approaches and then engages the first end stop. This may help ensure that the control valve 22 fully reaches the first end stop. In some instances, the first end stop may be detected by a change in BEMF 104, a higher sensed current draw from the stepper motor 94, and/or in any other suitable manner.

In some embodiments, the end stops may be detected by a change in the current rise time. For example, the current flow direction is periodically changed, alternatively in both motor coils of the stepper motor. The stepper motor armature (e.g., rotor) may be forced to make one step at each current flow direction change. It is contemplated that the stepper motor driver may limit currents flowing through the coils to a value of plus or minus $I_M$. The negative value of $I_M$ may be indicative of current flows in an opposite direction. The rise time between the current direction change and settling of current at the $I_M$ value is given by inductivity and resistance of the motor coil and by the BEMF value. When the motor armature rotates, an induced BEMF acts against current change and the result is a longer rise time $T_R$ of the transient curve. When the motor hits an end stop the armature is blocked and no BEMF is induced so the rise time $T_R$ is shorter when the end stop has been reached. The measurement of the rise time may be started when the current direction is changed and it may be stopped when the current reaches the threshold value $I_{TR}$ which is approx. 90% of the $I_M$ value. Thus, when $T_R$ drops below certain limit value the valve controller 26 detects that an end stop has been reached.

The valve controller 26 may then compare the number of counted steps to a reference value stored within the memory 30 of the valve controller 26, as shown at step 208. The reference value may represent a calibrated number of motor steps determined at the factory during manufacture of the gas valve assembly 10. The calibrated number of motor steps may be dependent on the tolerances of the particular gas valve assembly 10 and thus the reference value may be unique to the particular gas valve assembly 10. If the control valve 22 should become stuck at an intermediate position, or if the drive train 102 or other component should become worn, the counted number of motor steps may not match the reference value.

If the counted number of steps matches the reference value, the valve controller 26 may set its internal position counter to 0 (or some other initial value), as shown at step 210. It is contemplated the counted number of motor steps may considered to "match" the reference value when the counted number of motor steps equals the reference value. In some cases, the counted number of motor steps may considered to "match" the reference value when the counted number of motor steps is within a threshold or error margin of the reference value.

In some cases, when the calibration is performed at the beginning of a burner cycle, the valve controller 26 may then drive to control valve 22 to an ignition position to be ready for the up-coming burner cycle. In some instances, the ignition position may be a predetermined positioned between the first end stop and the second end stop. It is contemplated that to locate the control valve 22 in the predetermined position, the valve controller 26 may be configured to move the control valve 22 by stepping the stepper motor 94 and incrementing a position counter until the position counter reaches a predetermined "ignition" value.

If the counted number of steps does not match the reference value, the valve controller 26 may enter a lockout mode, as shown at step 212. The lockout mode may be configured to prevent the valve assembly 10 from supplying gas to a burner. It is contemplated that the valve assembly 10 may remain in the lockout mode until a technician can check the gas valve assembly 10 and clear the error. In some cases, the valve assembly 10 may be configured to provide an alert regarding the error. The alert may be a visual alert such as, but not limited to, an illuminated LED light, an alphanumeric or other error message displayed on a display screen, an alphanumeric or other error message transmitted to an external device (e.g., laptop, cell phone, secondary control system) in a wired or wireless manner. In another example, the valve assembly 10 may be configured to emit an audible alert such as a buzzing or a beeping sound. These are just some examples. It is contemplated that the lockout mode may be relayed to a user or technician in any suitable manner.

Figure 7:
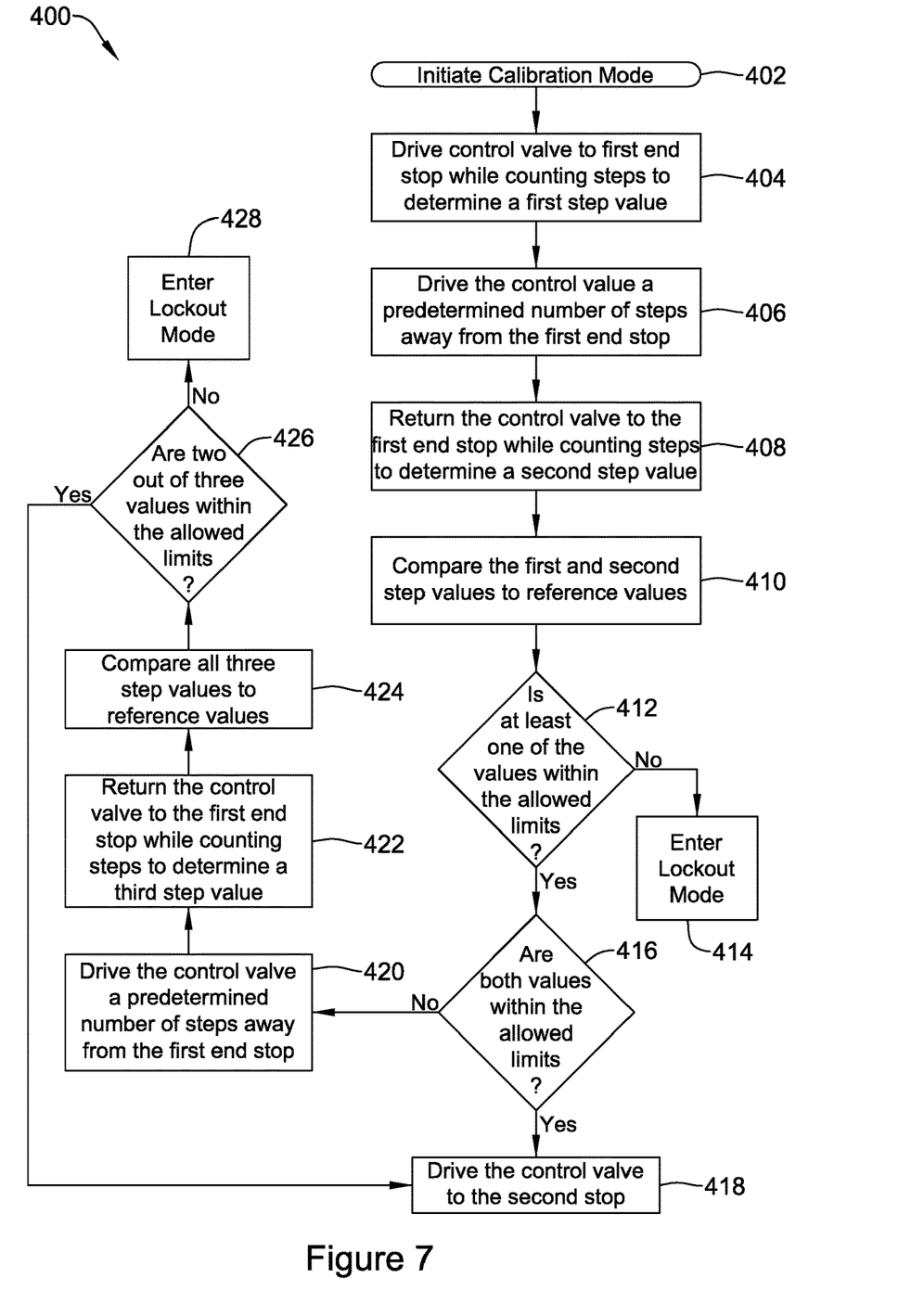
FIG. 7 is flow chart of another illustrative method for calibrating a position of a control valve.

FIG. 7 is another illustrative flow chart of a method 400 for calibrating the control valve 22 position from time to time. To begin, a calibration mode may be initiated within the valve controller 26, as shown at step 402. It is contemplated that the valve controller 26 may be configured to automatically initiate the calibration mode in response to a predetermined event. For example, the valve controller 26 may be configured to initiate the calibration mode upon power-up of the gas valve assembly. Alternatively, or additionally, when the gas valve assembly 10 is configured to supply gas to a burner that operates in burner cycles, the valve controller 26 may be configured to automatically initiate the calibration mode at the beginning of a burner cycle and/or at the end of a burner cycle. In some cases, the calibration mode may be initiated for each burner cycle, although this is not required. In other cases, the calibration mode may be initiated at a predetermined schedule based on, for example, a number of burner cycles or a length of time (e.g. hourly, daily, weekly, etc.). Alternatively, or additionally, the calibration mode may be initiated manually by an installer or technician, using, for example, an external device 40 or a user interface of the valve controller 26. Once in the calibration mode, the valve controller 26 may perform a calibration to verify that the physical position of the control valve 22 matches the position expected by the valve controller 26.

In some cases, once the calibration mode has been initiated, the valve controller 26 may move the control valve 22 via the stepper motor 94 to the fully closed position such that the control valve 22 is moved to or otherwise contacts a first end stop while counting the motor steps to determine a first step value, as shown at step 404. While the illustrative method is described with the control valve using the first end stop as a starting point, it should be understood that the reverse configuration, in which the second end stop is the starting point, may also be used. It is contemplated that the valve controller 26 may determine the control valve 22 is at an end stop using any suitable technique including any of the techniques described herein. Further, it is contemplated that the valve controller 26 may control movement of the control valve 22 using any suitable technique including any of the techniques described herein. In some cases, the stepper motor 94 may be driven a few steps (for example, in the range of 10 to 20 steps) at an enhanced current level as the control valve approaches and then engages the second end stop. This may help ensure that the control valve 22 fully reaches the first end stop. In some instances, the first end stop may be detected by a change in BEMF 104, a higher sensed current draw from the stepper motor 94, and/or in any other suitable manner.

In other embodiments, once the calibration mode has been initiated, the current level may be reduced to in the range of 70-90%, or approximately 80%, of the current level used in the normal operating mode. Reducing the current level may suppress or limit a bounce back of the motor armature when an end stop is contacted. For example, when operating at the currents of the normal operating mode, the motor armature may jump or bounce back to a greater extent than lower current levels which may negatively impact the precision of end stop detection.

Once the stepper motor 94 is at the first end stop, the valve controller 26 may set a step count of the motor 94 and/or a control valve 22 position to zero. In some cases, once the first end stop has been detected, the current level may be increased (e.g., in the range of up to 120% of normal operating level). The valve controller 26 may then move the control valve 22 via the stepper motor 94 for a few steps (e.g., up to about 30 steps) towards the fully open position a predetermined number of steps, as shown at step 406. In some instances, the predetermined number of steps may be in the range of 100-150 steps, although this is not required. Increasing the current level for the first few steps may reduce the likelihood that the valve drive train remains stuck at the first end stop. After the few steps at the increased currently level, the current level may be decreased back to in the range of 70-90%, or approximately 80%, and the control valve 22 may be moved via the stepper motor 94 towards the fully open position, or the second end stop, until the control valve 22 has moved a predetermined number of steps. The valve controller 26 may then drive the control valve 22 back to the first end stop via the stepper motor 94 while counting the steps to determine a second step value, as shown at step 408. The first and second step values may then be compared to reference values stored within the memory 30 of the valve controller 26, as shown at step 410. The valve controller 26 may then determine if at least one of the first or second step values are within an allowed limit, as shown at step 412. The allowed limits for the first and second step values may be the same or different, as desired. It is contemplated that the allowed limit for the first step value may depend on the starting location of the control valve 22 at the initiation of the calibration mode. The first and second step values may be considered to be within an allowed limit if the step values "match" or equal the reference values. In some cases, the counted number of motor steps (e.g., first or second step values) may considered to "match" or be within the allowed limits of the corresponding reference value when the counted number of motor steps (e.g., first or second step values) is within a threshold or error margin of the corresponding reference value.

If neither of the first or the second step values are within the allowed limits, the valve controller 26 may enter a lockout mode, as shown at step 414. The lockout mode may be configured to prevent the valve assembly 10 from supplying gas to a burner. It is contemplated that the valve assembly 10 may remain in the lockout mode until a technician can check the gas valve assembly 10 and clear the error. In some cases, the valve assembly 10 may be configured to provide an alert regarding the error. The alert may be a visual alert such as, but not limited to, an illuminated LED light, an alphanumeric or other error message displayed on a display screen, an alphanumeric or other error message transmitted to an external device (e.g., laptop, cell phone, secondary control system) in a wired or wireless manner. In another example, the valve assembly 10 may be configured to emit an audible alert such as a buzzing or a beeping sound. These are just some examples. It is contemplated that the lockout mode may be relayed to a user or technician in any suitable manner.

If at least one of the first or the second step values are within the allowed limits, the valve controller 26 may then determine if both values or only one of the values is within the allowed limits, as shown at step 416. If both values are within the allowed limits, the physical location of the control valve 22 is considered to match the expected position and the valve controller 26 may move the control valve 22 via the stepper motor 94 to the second end stop, or other location, to ready the control valve 22 for use, as shown at step 418.

If only one of the first or second step values are within the allowed limits, the valve controller 26 may again drive the control valve 22 via the stepper motor 94 for a predetermined number of steps towards the fully open position, as shown at step 420. In some instances, the predetermined number of steps may be in the range of 100-150 steps, although this is not required. The valve controller 26 may then drive the control valve 22 back to the first end stop via the stepper motor 94 while counting the steps to determine a third step value, as shown at step 422.

The valve controller 26 may then compare the number of counted steps (e.g., first, second, and third step values) reference values stored within the memory 30 of the valve controller 26, as shown at step 424. The valve controller 26 may then determine if at least two of the first, second, or third step values are within an allowed limit, as shown at step 426. The allowed limits for the first, second, and third step values may be the same or different, as desired. It is contemplated that the allowed limit for the first step value may depend on the starting location of the control valve 22 at the initiation of the calibration mode. The first, second, and third step values may be considered to be within an allowed limit if the step values "match" or equal the reference values. In some cases, the counted number of motor steps (e.g., first or second step values) may considered to "match" or be within the allowed limits of the corresponding reference value when the counted number of motor steps (e.g., first, second, or third step values) is within a threshold or error margin of the corresponding reference value.

If only one of the first, second, or third step values are within the allowed limits, the valve controller 26 may enter a lockout mode, as shown at step 428. The lockout mode may be configured to prevent the valve assembly 10 from supplying gas to a burner. It is contemplated that the valve assembly 10 may remain in the lockout mode until a technician can check the gas valve assembly 10 and clear the error. In some cases, the valve assembly 10 may be configured to provide an alert regarding the error. The alert may be a visual alert such as, but not limited to, an illuminated LED light, an alphanumeric or other error message displayed on a display screen, an alphanumeric or other error message transmitted to an external device (e.g., laptop, cell phone, secondary control system) in a wired or wireless manner. In another example, the valve assembly 10 may be configured to emit an audible alert such as a buzzing or a beeping sound. These are just some examples. It is contemplated that the lockout mode may be relayed to a user or technician in any suitable manner.

If two of the three values are within the allowed limits, the physical location of the control valve 22 is considered to match the expected position and the valve controller 26 may move the control valve 22 via the stepper motor 94 to the second end stop, or other location, to ready the control valve 22 for use, as shown at step 418.

In some cases, the reference values may represent a calibrated number of motor steps determined at the factory during manufacture of the gas valve assembly 10. The calibrated number of motor steps may be dependent on the tolerances of the particular gas valve assembly 10 and thus the reference value may be unique to the particular gas valve assembly 10. If the control valve 22 should become stuck at an intermediate position, or if the drive train 102 or other component should become worn, the counted number of motor steps may not match the reference value.

In some cases, when the calibration is performed at the beginning of a burner cycle, the valve controller 26 may then drive to control valve 22 to an ignition position at step 418 to be ready for the up-coming burner cycle. In some instances, the ignition position may be a predetermined positioned between the first end stop and the second end stop. It is contemplated that to locate the control valve 22 in the predetermined position, the valve controller 26 may be configured to move the control valve 22 by stepping the stepper motor 94 and incrementing a position counter until the position counter reaches a predetermined "ignition" value.

It should be understood that this disclosure is, in many respects, only illustrative. The various individual elements discussed above may be arranged or configured in any combination thereof without exceeding the scope of the disclosure. Changes may be made in details, particularly in matters of shape, size, and arrangement of steps without exceeding the scope of the disclosure. The disclosure's scope is, of course, defined in the language in which the appended claims are expressed.

What is claimed is:

1. A method for calibrating a position of a control valve within a gas valve assembly, the method comprising:
   initiating a calibration mode in a controller of the gas valve assembly;
   once in the calibration mode, the controller is configured to:
   move the control valve to a second end stop;
   move the control valve from the second end stop to a first end stop while counting a number of steps traveled by a stepper motor driving the control valve;
   comparing the counted number of steps traveled from the second end stop to the first end stop to a reference value stored in a memory of the controller;
   wherein when the counted number of steps matches the reference value, the controller resets a position counter to an initial value;
   wherein when the counted number of steps does not match the reference value, the controller enters a lockout mode and keeps the control valve at the first end stop, and
   wherein moving the control valve from the second end stop to the first end stop comprises moving the control valve a full valve stroke of the control valve plus a predetermined clearance margin, wherein the predetermined clearance margin accounts for particular tolerances associated with the gas valve assembly.

2. The method of claim 1, wherein:
when the control valve is at the first end stop, the control valve is in a fully closed position; and
when the control valve is at the second end stop, the control valve is in a fully open position.

3. The method of claim 1, wherein when moving the control valve from the second end stop to the first end stop, the controller is configured to initially operate the stepper motor in a higher current mode for a predetermined number of motor steps before operating the stepper motor in an end stop detect mode whereby the control valve reaching the first end stop is detected by a sensed a higher current draw from the stepper motor.

4. The method of claim 1, wherein the gas valve assembly further comprises a drive train from the stepper motor to the control valve, and wherein the predetermined clearance margin accounts for particular tolerances associated with the drive train.

5. The method of claim 1, wherein the controller is configured to initiate the calibration mode upon power-up of the gas valve assembly.

6. The method of claim 1, wherein the gas valve assembly is configured to supply gas to a burner that operates in burner cycles, wherein the controller is configured to initiate the calibration mode at an end of a burner cycle.

7. The method of claim 6, wherein when the counted number of steps matches the reference value, the controller resets the position counter to the initial value before moving the control valve to a predetermined position between the second end stop and the first end stop by stepping the stepper motor while incrementing the position counter until the position counter reaches a predetermined value.

8. The method of claim 7, wherein the predetermined position corresponds to an ignition position of the burner.

9. A gas valve assembly for controlling fuel flow to a combustion appliance, the gas valve assembly comprising:
a valve body with an inlet port and an outlet port, and a fluid path extending between the inlet port and the outlet port, the valve body further including a control valve situated in the fluid path between the inlet port and the outlet port;
a drive train coupled to the control valve;
a stepper motor coupled to the drive train;
a controller secured relative to the valve body and in communication with the stepper motor, the controller configured to command the stepper motor to drive the control valve via the drive train between a fully open position, a fully closed position, and a plurality of intermediate positions;
wherein the controller is configured to selectively enter a calibration mode and once in the calibration mode, the controller is configured to:
command the stepper motor to drive the control valve to the fully open position;
once the control valve is in the fully open position, command the stepper motor to drive the control valve from the fully open position to the fully closed position while counting a number of steps traveled by the stepper motor;
comparing the counted number of steps traveled by the stepper motor to a reference value stored in a memory of the controller; and
wherein when the counted number of steps does not match the reference value, the controller is configured to enter a lockout mode and keeps the control valve in the fully closed position, and
wherein moving the control valve from the fully open position to the fully closed position comprises moving the control valve a full stroke plus a predetermined clearance margin, wherein the predetermined clearance margin accounts for particular tolerances associated with the gas valve assembly.

10. The gas valve assembly of claim 9, wherein the predetermined clearance margin accounts for particular tolerances associated with the drive train.

11. The gas valve assembly of claim 9, wherein the controller is configured to initiate the calibration mode upon power-up of the gas valve assembly.

12. The gas valve assembly of claim 9, wherein the combustion appliance includes a burner that operates in burner cycles, wherein the controller is configured to initiate the calibration mode at an end of a burner cycle.

13. The gas valve assembly of claim 12, wherein when the counted number of steps matches the reference value, the controller is configured to resets a position counter to an initial value before commanding the control valve to a predetermined position between the fully closed position and the fully open position by stepping the stepper motor while incrementing the position counter until the position counter reaches a predetermined value.

14. The gas valve assembly of claim 13, wherein the predetermined position corresponds to an ignition position of the burner.

15. The gas valve assembly of claim 9, wherein when moving the control valve from the fully open position to the fully closed position, the controller is configured to initially operate the stepper motor in a higher current mode for a predetermined number of motor steps before operating the stepper motor in an end stop detect mode whereby the control valve reaching the fully closed position is detected by a sensed a higher current draw from the stepper motor.

16. A gas valve assembly for controlling fuel flow to a burner, the gas valve assembly comprising:
a valve body with an inlet port and an outlet port, and a fluid path extending between the inlet port and the outlet port, the valve body further including a control valve situated in the fluid path between the inlet port and the outlet port;
a stepper motor for driving the control valve;
a controller for controlling the stepper motor, the controller configured to command the stepper motor to drive the control valve between a first end stop and a second end stop; wherein the controller is configured to selectively enter a calibration mode and once in the calibration mode, the controller is configured to:
command the stepper motor to drive the control valve to the second end stop;
once the control valve is at the second end stop, command the stepper motor to drive the control valve from the second end stop to the first end stop while counting a number of steps traveled by the stepper motor;
comparing the counted number of steps traveled by the stepper motor to a reference value; and
wherein when the counted number of steps does not match the reference value, the controller is configured to enter a lockout mode and keeps the control valve at the first end stop, and
wherein moving the control valve from the second end stop to the first end stop comprises moving the control valve a full valve stroke of the control valve plus a predetermined clearance margin, wherein the predetermined clearance margin accounts for particular tolerances associated with the gas valve assembly.

17. The gas valve assembly of claim 16, wherein when the counted number of steps matches the reference value, the controller is configured to reset a position counter to an initial value before moving the control valve to a predetermined position between the second end stop and the first end stop by stepping the stepper motor while incrementing the position counter until the position counter reaches a predetermined value.

18. The gas valve assembly of claim 17, wherein the predetermined position corresponds to an ignition position of the burner.

* * * * *